US012606231B1

(12) United States Patent

Haubenstricker et al.

(10) Patent No.: US 12,606,231 B1

(45) Date of Patent: Apr. 21, 2026

(54) COLLAPSIBLE STEERING COLUMN ASSEMBLY WITH RELEASABLY ATTACHED SPRING

(71) Applicant: Steering Solutions IP Holding Corporation, Saginaw, MI (US)

(72) Inventors: Kevin J. Haubenstricker, Frankenmuth, MI (US); Brian J. Magnus, Frankenmuth, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/094,325

(22) Filed: Mar. 28, 2025

(51) Int. Cl.
| | |
|---|---|
| B62D 1/19 | (2006.01) |
| B62D 1/189 | (2006.01) |
| B62D 5/00 | (2006.01) |
| F16F 7/12 | (2006.01) |

(52) U.S. Cl.
CPC ............. B62D 1/192 (2013.01); B62D 1/189 (2013.01); B62D 5/001 (2013.01); F16F 7/12 (2013.01)

(58) Field of Classification Search
CPC . B62D 1/192; B62D 1/19; B62D 1/18; B62D 1/181; B62D 1/183; B62D 1/185; B62D 1/187; B62D 1/189; B62D 1/195; B62D 1/197; B62D 5/001; F16C 2326/24; F16F 7/12

USPC ........... 280/777, 775; 74/492, 493; 180/402
See application file for complete search history.

(56) References Cited

U.S. PATENT DOCUMENTS

| | | | | |
|---|---|---|---|---|
| 7,780,196 | B2 * | 8/2010 | Cymbal ................ | B62D 1/184 |
| | | | | 188/374 |
| 8,955,881 | B2 * | 2/2015 | Tinnin ................... | B62D 1/187 |
| | | | | 280/775 |
| 2002/0189888 | A1 * | 12/2002 | Magnus ................ | B62D 5/006 |
| | | | | 180/443 |
| 2018/0141582 | A1 * | 5/2018 | Bodtker ................ | B62D 1/195 |

\* cited by examiner

*Primary Examiner* — Keith J Frisby
(74) *Attorney, Agent, or Firm* — Dickinson Wright PLLC

(57) ABSTRACT

A steering column assembly comprising an upper jacket, a lower jacket, a column mounting bracket operatively coupled to the lower jacket, and a spring extending from a first end to a second end. The upper jacket is telescopingly adjustable within the lower jacket over a range of driving positions between a retracted column position and an extended column position and moveable to a range of collapse positions beyond the retracted column position when moving away from the extended column position. The first end of the spring is releasably coupled to the column mounting bracket such that the spring disengages from the column mounting bracket in response to an impact force which moves the upper jacket into the range of collapse positions. The second end of the spring is disposed within an interior region of the upper jacket.

19 Claims, 3 Drawing Sheets

COLLAPSIBLE STEERING COLUMN ASSEMBLY WITH RELEASABLY ATTACHED SPRING

TECHNICAL FIELD

The following disclosure relates to vehicle steering systems and, more particularly, an improved arrangement for packaging a biasing spring within a steering column assembly.

BACKGROUND

A vehicle, such as a car, truck, sport utility vehicle, crossover, mini-van, marine craft, aircraft, all-terrain vehicle, recreational vehicle, or other suitable vehicles, include various steering systems to carry out steering maneuvers. These steering systems typically include a steering column assembly for translating steering input to an output that interacts with a steering linkage to ultimately cause the vehicle wheels to turn. The steering column assembly must balance durability, safety, and ease of use while accommodating various design constraints. A design factor in steering column assemblies is the size of the steering column assembly and occupant safety in the event of a vehicle collision.

Traditional steering column designs have an upper shaft and a lower shaft which connect—via mechanical linkage—a steering wheel and road wheels. In such a configuration, several limitations with respect to collapse performance exist as it relates to functionality and costliness. Steer-by-wire systems eliminate the continuous mechanical connection between the steering wheel and the road wheels by having one or more hand wheel actuators and one or more road wheel actuators utilized to control steering of a vehicle. The steer-by-wire systems offer design simplifications and enhancements in some respects, when compared to steering columns requiring a continuous mechanical connection between the steering wheel and the road wheels.

One such component is a spring, which is often used to maintain position, assist in column rake, tilt or telescoping adjustments, or control energy absorption during a crash event. The springs are typically applied between a mounting bracket and a moveable portion of the column in order to obtain a given rake position and/or rake effort. These springs are located exterior to the column jacket assembly. Depending on the spring design, a considerable amount of package space may be required by the spring in order to maintain the required clearance.

SUMMARY OF THE DISCLOSURE

According to one aspect of the disclosure, a steering column assembly comprises an upper jacket, a lower jacket, a column mounting bracket operatively coupled to the lower jacket, and a spring extending from a first end to a second end. The upper jacket is telescopingly adjustable within the lower jacket over a range of driving positions between a retracted column position and an extended column position and moveable to a range of collapse positions beyond the retracted column position when moving away from the extended column position. The first end of the spring is releasably coupled to the column mounting bracket such that the spring disengages from the column mounting bracket in response to an impact force which moves the upper jacket into the range of collapse positions. The second end of the spring is disposed within an interior region of the upper jacket.

According to another aspect of the disclosure, the steering column assembly further comprises a hand wheel actuator and an adaptor. The hand wheel actuator is disposed between an end of the upper jacket and a steering input device. The adaptor is operatively coupled to the hand wheel actuator and disposed between the hand wheel actuator and the upper jacket.

According to another aspect of the disclosure, the adaptor contacts the second end of the spring in response to an impact force resulting in translation of the upper jacket away from the extended column position. Further, the first end of the spring disengages from the column mounting bracket in response to the adaptor contacting the second end of the spring. The spring moves with the adaptor when the first end of the spring disengages from the column mounting bracket.

According to another aspect of the disclosure, the spring deforms in response to the impact force.

According to another aspect of the disclosure, the spring is a rake spring. The rake spring includes a curved portion disposed between, and connecting, the first end and the second end of the rake spring. An end of the upper jacket contacts the curved portion of the rake spring in response to an impact force resulting in translation of the upper jacket away from the extended column position and the first end of the spring disengages from the column mounting bracket in response to the end of the upper jacket contacting the curved portion of the spring.

According to another aspect of the disclosure, an end of the upper jacket contacts the second end of the spring in response to an impact force resulting in translation of the upper jacket away from the extended column position. Further, the first end of the spring disengages from the column mounting bracket in response to the end of the upper jacket contacting the second end of the spring. The spring moves relative to the column mounting bracket when the first end of the spring disengages from the column mounting bracket.

These and other aspects of the present disclosure are disclosed in the following detailed description of the embodiments, the appended claims, and the accompanying figures.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF EMBODIMENTS

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
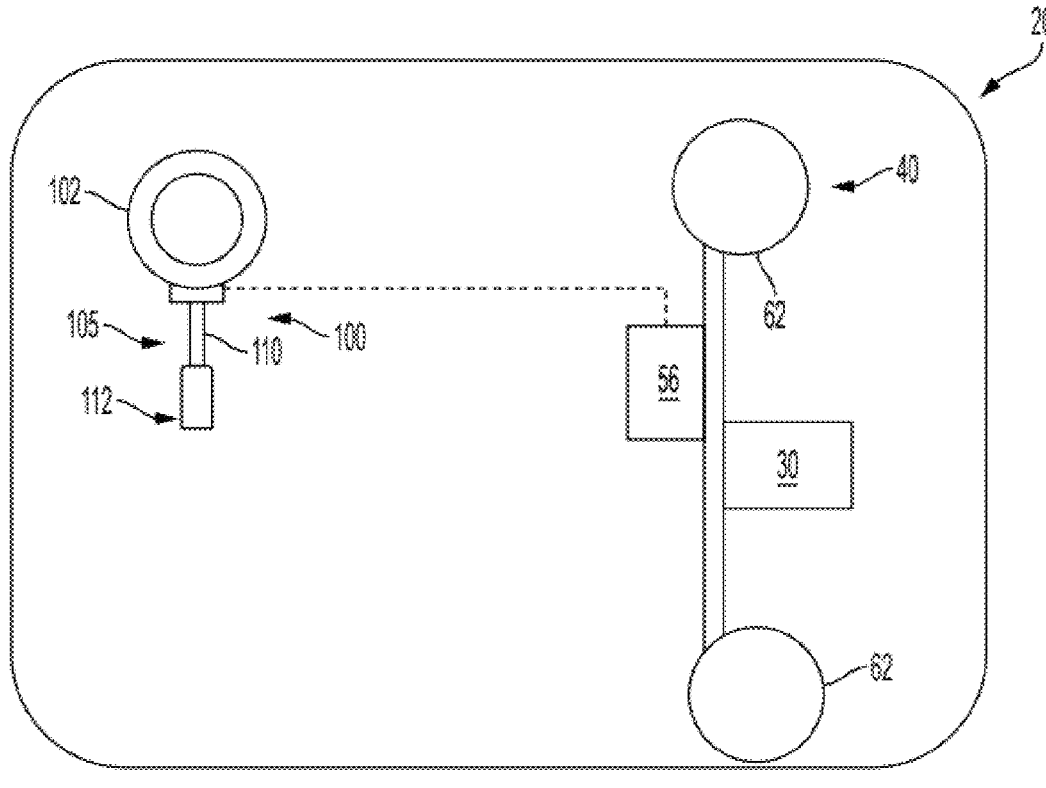
FIG. 1 schematically illustrates a vehicle steering system.

Referring initially to FIG. 1, a vehicle 20 is generally illustrated according to the principles of the present disclosure. The vehicle 20 may be any vehicle, such as a car, a truck, a sport utility vehicle, a mini-van, a crossover, any other passenger vehicle, any commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an internal combustion system, an electric system, or combinations thereof.

The vehicle 20 includes a steering system 40. The steering system 40 may be configured as a driver interface steering system, an autonomous driving system, or a system that allows for both interface of the driver and autonomous steering. The steering system includes a steering input device 102, such as a steering wheel, wherein the driver may manually provide a steering input by turning the steering wheel. A steering column assembly 100 includes a steering column 105 that extends along an axis. A hand wheel actuator ("HWA") 106 (which may also be referred to as an "emulator") is provided in the steer-by-wire system and is used to provide feedback and assistance to the steering input device 102 and to receive manual inputs for steering control from the driver.

The steering column 105 includes one or more portions, for example, an upper jacket 110 and a lower jacket 112. While two jackets are illustrated and described, it is to be appreciated that a single jacket or three or more jackets may be provided in some embodiments. Regardless of the number of jackets, the jackets may be axially and or height adjustable to be moveable over a range of positions to meet preferences of the driver for positioning of the steering input device 102.

A road wheel actuator ("RWA") 56 is in operative communication with the hand wheel actuator 106. The road wheel actuator 56 actuates lateral maneuvers of the vehicle 20 in response to inputs received from the hand wheel actuator 106. Each of the hand wheel actuator 106 and the road wheel actuator 56 may include a respective processor and controller or a single processor may be in communication with a respective controller of each of the hand wheel actuator 106 and the road wheel actuator 56. The road wheel actuator 56 is part of a system which includes an output that drives a rack, ball screw or any other cross-car oriented component that is operatively coupled to the road wheels 62.

Historically, a continuous mechanical connection spanning multiple components was utilized to connect the steering wheel 102 to the vehicle road wheels 62. However, steer-by-wire systems have eliminated the need for an uninterrupted mechanical connection between the steering wheel 102 and the vehicle road wheels 62. For example, a steering shaft which couples to the steering wheel and one or more additional shafts (e.g., intermediate shaft) is no longer needed in some systems. Advancements such as those outlined above present new opportunities and challenges in steer-by-wire systems. For example, certain components may be moved away from traditional locations to new locations within the system.

Figure 2:
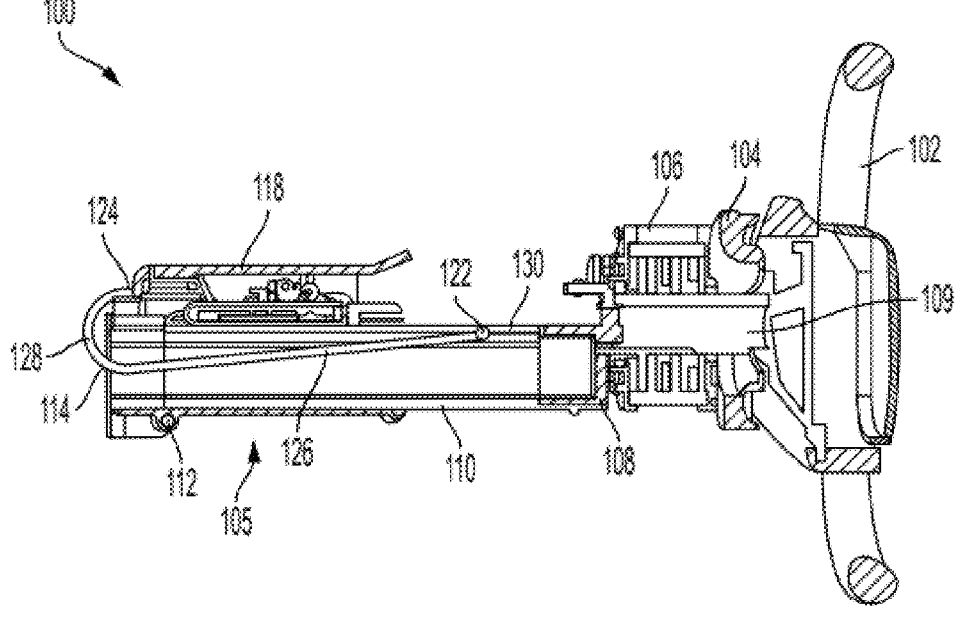
FIG. 2 is a side, cross sectional view of a steering column assembly of a steering system.
Figure 3:
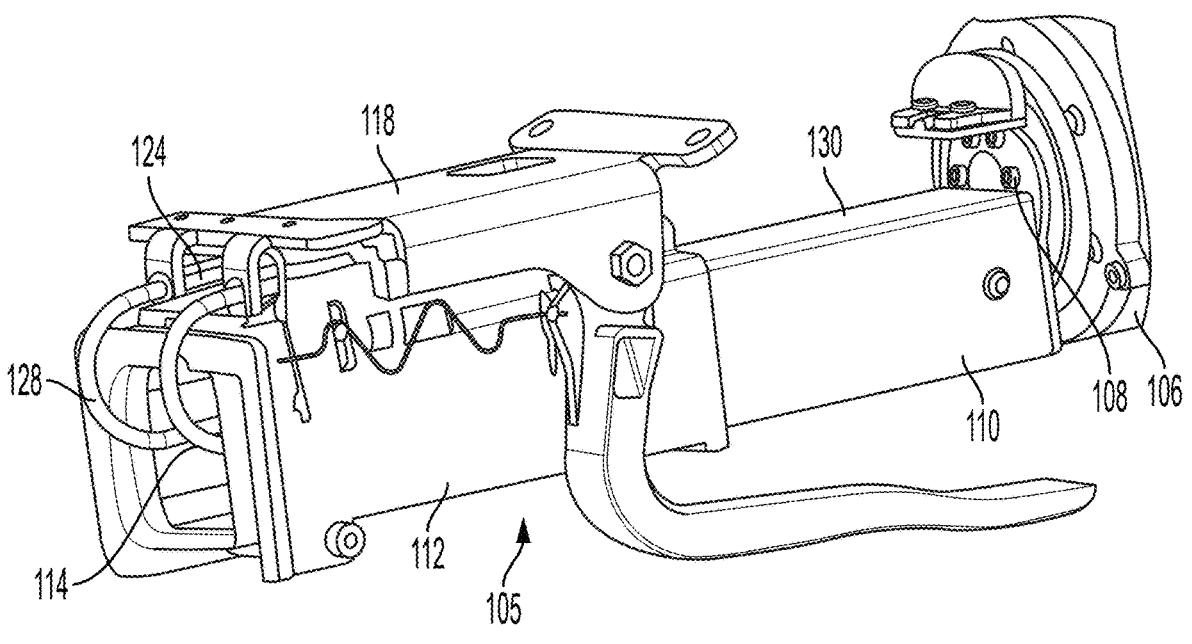
FIG. 3 is a perspective view of the steering column assembly of FIG. 2.
Figure 4:
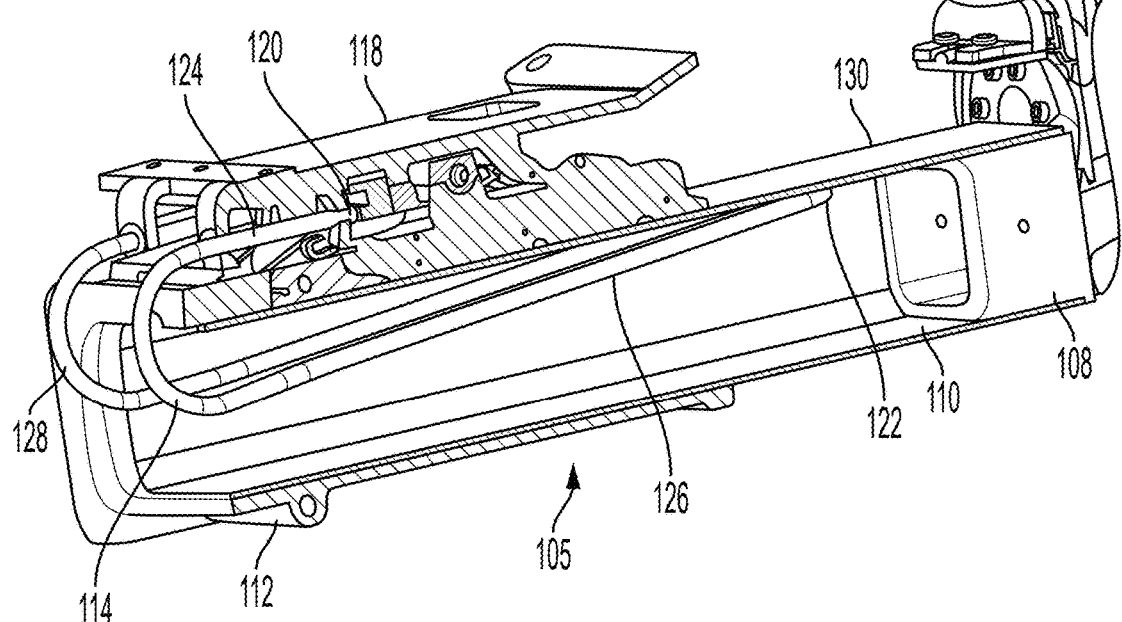
FIG. 4 is a perspective cross sectional view of the steering column assembly of FIG. 2.
Figure 5:
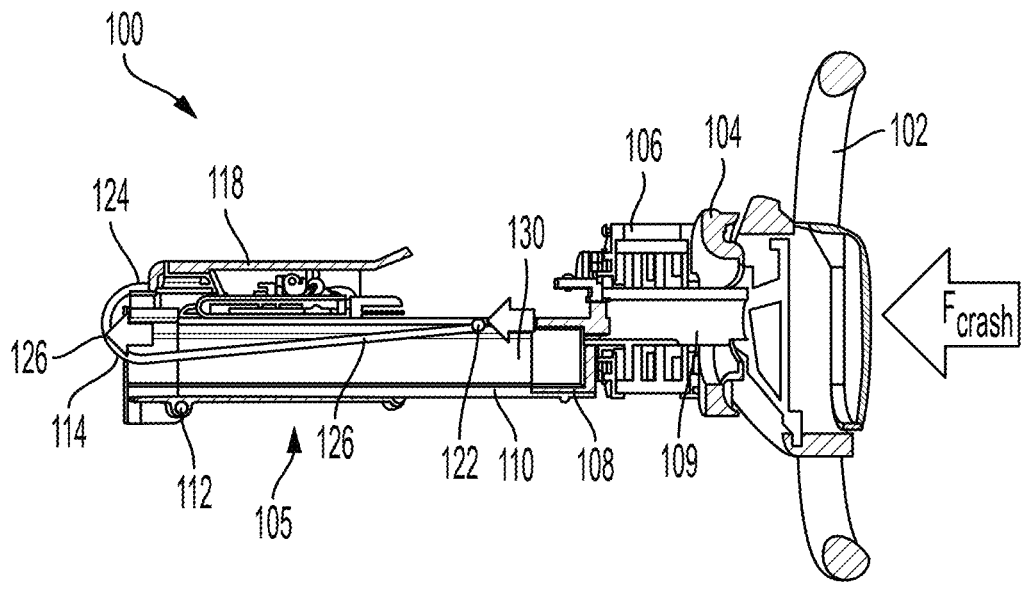
FIG. 5 is a force diagram of the steering column assembly during a vehicle collision.

Referring to FIGS. 2-4, the steering column assembly 100 is illustrated in more detail. The steering column assembly 100 includes the steering input device 102, a motor 104, the hand wheel actuator 106, an adaptor 108, a spindle 109, the upper jacket 110, the lower jacket 112, a spring 114, and a column mounting bracket 118. The steering column assembly 100 is configured to facilitate the transmission of steering input from the driver to the emulator 106 while maintaining structural integrity and ergonomic performance. The steering input device 102 is operatively coupled to the spindle 109 which resides within the hand wheel actuator 106 and is mounted to an end of the steering column assembly 100. The steering input device 102 is rotated in response to driver inputs and actuation by the hand wheel actuator 106. The steering input device 102 serves as the primary interface for the driver to control direction of the vehicle 20. The steering input device 102 may be a steering wheel where the driver may mechanically provide a steering input by turning the steering wheel. The hand wheel actuator 106 is located between the steering input device 102 and the adaptor 108. The motor 104 is electrically connected to a controller, which receives the steering input from the steering input device 102 to initiate movement. The controller may regulate the operation, speed, torque, and direction of the motor 104.

The adaptor 108 is connected between the hand wheel actuator 106 and the upper jacket 110 to provide a structural connection between the jackets 110, 112 and the steering input device 102. The upper jacket 110 and the lower jacket 112 are permitted to move axially with respect to one another to allow the driver to adjust the position of the steering input device 102 and during an impact event for safety purposes. The relative axial movement is described herein as being telescoping, wherein the upper jacket 110 telescopes within the lower jacket 112 over a range of axial positions from an extended column position to a retracted column position. The upper jacket 110 supports the steering input device 102 and the motor 104, allowing for controlled extension and retraction between the extended column position and the retracted column position. The interface between the upper jacket 110 and the lower jacket 112 incorporates low-friction surfaces or bearing elements to reduce resistance during adjustment. The lower jacket 112 is fixed to the vehicle 20, providing a stable base for column movement.

In this embodiment, the spring 114 is a rake spring. The spring 114 has a first end 120 and a second end 122. A first portion 124 extends from the first end 120 of the spring 114 and a second portion 126 extends from the second end 122 of the spring 114. The first portion 124 and the second portion 126 of the spring 114 are connected by a curved portion 128 of the spring 114. In some embodiments, the second portion 126 of the spring 114 is disposed within an interior cavity defined by the upper jacket 110 (depicted in FIGS. 2-5). In other embodiments, a portion of the second portion 126 of the spring 114 is disposed within the interior cavity of the upper jacket 110. The second portion 126 of the spring 114 being partially/completely disposed within the interior cavity of the upper jacket 110 reduces a considerable amount of packaging space that would have been required by the spring 114 being located on an exterior of the steering column assembly 100 since only the first portion 124 of the rake spring 114 protrudes radially outwardly of the upper jacket 110.

The first end 120 of the spring 114 is releasably coupled to the column mounting bracket 118 such that the spring 114 disengages from the column mounting bracket 118 in response to an impact force which leads to a column collapse condition. In particular, the upper jacket 110 is moveable relative to the lower jacket 112 over a range of driving positions between the retracted column position and the extended column position. The range of driving positions are positions which allow the driver to grasp the steering input device 102 during operation. During an impact event (e.g., collision) between the driver and the steering input device 102, the steering column assembly 100 is equipped with an energy absorption system which allows the upper jacket 110 to move beyond the retracted column position to a range of collapse positions away from the extended column position. Movement of the upper jacket 110 relative to the lower jacket 112 over the range of collapse positions absorbs energy of the impact force.

The column mounting bracket 118 is attached to a vehicle structure to mount the steering column assembly 100 within the vehicle 20. The second end 122 of the spring 114 is disposed within an interior region of the upper jacket 110. The second end 122 of the spring 114 slides or rolls on an interior surface of the upper jacket 110. The spring 114 is configured to assist with balancing the steering column 105 in a given rake position when the steering column 105 is not locked in place.

As discussed above, the steering column assembly 100 is configured to collapse in a controlled manner when the steering column assembly 100 experiences the impact force (depicted in FIG. 5 as $F_{crash}$), such as that generated during a vehicle collision. The collapse is designed to absorb energy and reduce the force transmitted to the driver, thereby mitigating injury risk.

During the collapse of the steering column 105, the adaptor 108 may contact the second end 122 of the spring 114 which would block the adaptor 108 and the upper jacket 110 from the range of collapse positions. In one embodiment, the first end 120 of the spring 114 disengages from the column mounting bracket 118 in response to the adaptor 108 contacting the second end 122 of the spring 114 such that the spring 114 does not block the adaptor 108 and the upper jacket 110 from the range of collapse positions. Further, the spring 114 moves with the adaptor 108 when the first end 120 of the spring 114 disengages from the column mounting bracket 118.

In another embodiment, the spring 114 deforms when the adaptor 108 contacts the second end 122 of the spring 114 such that the spring 114 does not block the adaptor 108 and the upper jacket 110 from the range of collapse positions. The spring 114 deforms such that overall length of the spring 114 from the first end 120 to the second end 122 is decreased.

Further, during collapse of the steering column 105, an end 130 of the upper jacket 110 proximate to the adaptor 108 may contact the second end 122 of the spring 114 which would block the adaptor 108 and the upper jacket 110 from the range of collapse positions. The first end 120 of the spring 114 would disengage from the column mounting bracket 118 in response to the end 130 of the upper jacket 110 contacting the second end 122 of the spring 114 such that the spring 114 does not block the adaptor 108 and the upper jacket 110 from the range of collapse positions. Further, the spring 114 moves relative to the column mounting bracket 118 when the first end 120 of the spring 114 disengages from the column mounting bracket 118.

Further, during collapse of the steering column 105, the other end of the upper jacket 110 proximate to the curved portion 128 of the spring 114 may contact the curved portion 128 of the spring 114 which would block the steering column 105 from the range of collapse positions. The first end 120 of the spring 114 would disengage from the column mounting bracket 118 in response to the other end of the upper jacket 110 contacting the curved portion 128 of the spring 114 such that the spring 114 does not block the steering column 105 from the range of collapse positions.

Various modifications and variations of the present disclosure are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A steering column assembly, comprising:
an upper jacket;
a lower jacket, wherein the upper jacket is telescopingly adjustable within the lower jacket over a range of driving positions between a retracted column position and an extended column position and moveable to a range of collapse positions beyond the retracted column position when moving away from the extended column position;
a column mounting bracket operatively coupled to the lower jacket; and
a spring extending from a first end to a second end, wherein the first end of the spring is releasably coupled to the column mounting bracket such that the spring disengages from the column mounting bracket in response to an impact force which moves the upper jacket into the range of collapse positions, wherein the second end of the spring is disposed within an interior region of the upper jacket.

2. The steering column assembly according to claim 1, further comprising a hand wheel actuator and an adaptor, the hand wheel actuator being disposed between an end of the upper jacket and a steering input device, the adaptor being operatively coupled to the hand wheel actuator and disposed between the hand wheel actuator and the upper jacket.

3. The steering column assembly according to claim 2, wherein the adaptor contacts the second end of the spring in response to an impact force resulting in translation of the upper jacket away from the extended column position.

4. The steering column assembly of claim 3, wherein the first end of the spring disengages from the column mounting bracket in response to the adaptor contacting the second end of the spring.

5. The steering column assembly according to claim 4, wherein the spring moves with the adaptor when the first end of the spring disengages from the column mounting bracket.

6. The steering column assembly according to claim 1, wherein the spring deforms in response to the impact force.

7. The steering column assembly according to claim 1, wherein the spring is a rake spring.

8. The steering column assembly according to claim 7, wherein the rake spring includes a curved portion disposed between, and connecting, the first end and the second end of the rake spring.

9. The steering column assembly according to claim 8, wherein an end of the upper jacket contacts the curved portion of the rake spring in response to an impact force resulting in translation of the upper jacket away from the extended column position and the first end of the spring disengages from the column mounting bracket in response to the end of the upper jacket contacting the curved portion of the spring.

10. The steering column assembly according to claim 1, wherein an end of the upper jacket contacts the second end of the spring in response to an impact force resulting in translation of the upper jacket away from the extended column position.

11. The steering column assembly of claim 10, wherein the first end of the spring disengages from the column mounting bracket in response to the end of the upper jacket contacting the second end of the spring.

12. The steering column assembly according to claim 11, wherein the spring moves relative to the column mounting bracket when the first end of the spring disengages from the column mounting bracket.

13. A steering column assembly, comprising:

a column jacket defining a hollow cavity therein;

a bracket connected to the column jacket; and a rake spring extending from a first end to a second end, wherein at least a portion of the rake spring is disposed within the hollow cavity of the column jacket.

14. The steering column assembly according to claim 13, further comprising a hand wheel actuator and an adaptor, the hand wheel actuator being disposed between the column jacket and a steering input device, the adaptor being operatively coupled to the hand wheel actuator and disposed between the hand wheel actuator and the column jacket.

15. The steering column assembly according to claim 14, wherein the adaptor contacts the second end of the rake spring in response to an impact force on the column jacket.

16. The steering column assembly according to claim 15, wherein the first end of the rake spring disengages from the bracket in response to the adaptor contacting the second end of the rake spring.

17. The steering column assembly according to claim 16, wherein the rake spring moves with the adaptor when the first end of the rake spring disengages from the bracket.

18. The steering column assembly according to claim 15, wherein the rake spring deforms in response to the impact force.

19. The steering column assembly according to claim 13, wherein the rake spring includes a curved portion disposed between, and connecting, the first end and the second end of the rake spring.

\* \* \* \* \*